Oct. 22, 1957     T. RAPHAEL ET AL     2,810,775
PLATE SEPARATOR FOR STORAGE BATTERIES
Filed Feb. 16, 1956
FIG. 1.
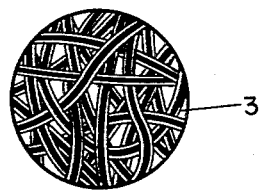         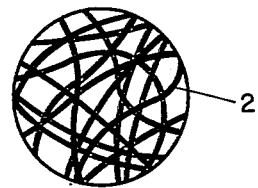
FIG. 2.         FIG. 3.

United States Patent Office 2,810,775
Patented Oct. 22, 1957

2,810,775

PLATE SEPARATOR FOR STORAGE BATTERIES

Thomas Raphael, Winchester, and Richard W. Schweizer, Bedford, Mass., assignors to W. R. Grace Co., Cambridge, Mass., a corporation of Connecticut Application February 16, 1956, Serial No. 565,796

8 Claims. (Cl. 136—145)

This invention relates to plate separators for use in storage batteries of the lead-acid type. It especially relates to battery separators which are formed from a cellulosic web which has been impregnated with an acid-resistant thermosetting resin. It is the primary purpose of this invention to render such separators resistant to oxidation when in contact with the lead dioxide present on the positive plates of a lead-acid storage battery.

In the most common type of lead-acid cell, the electrodes or plates consist of grids of lead or an alloy of lead to which the active material has been applied as a paste. The purpose of using a paste is to obtain a porous structure of the active material, thereby increasing the available surface area for the electrochemical reaction. In the case of a fully charged positive plate, the active material is lead dioxide ($PbO_2$) and, in the case of a fully charged negative plate, the active material is elemental lead. The electrolyte is an aqueous solution of sulfuric acid ($H_2SO_4$).

It is generally agreed [1] the chemical reaction within the cell proceeds according to the following overall relation:

$$PbO_2 + Pb + 2H_2SO_4 = 2PbSO_4 + 2H_2O$$

wherein the left hand side represents the fully charged condition and the right hand side represents the fully discharged condition of the cell.

Taking the two types of plates individually, the reaction takes place as follows:

At the positive plate:

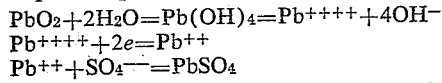

At the negative plate:

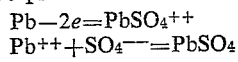

In the above relations, the symbol "$e$" is used to represent a single negative charge or electron.

Since the sulfate ion ($SO_4^{--}$) is formed by the dissociation of sulfuric acid as follows:

it is obvious that during discharge, for each two electrons transferred from the negative to the positive plate through the external connection, there is an increase of 2 hydrogen ions in the vicinity of the negative plate and a net decrease of 2 hydrogen ions in the vicinity of the positive plate. Thus, the external flow of current is accompanied by a corresponding internal flow of hydrogen ions from one plate to the other in the electrolyte. Since the electrolyte does offer an appreciable resistance to the passage of the hydrogen ions, it is obvious that, if it is desired to obtain a high current output, the plates of opposite polarity should be placed as close together as possible.

In view of the nature of the electochemical reaction, the need for and the requirements of a plate separator in a high current output lead-acid storage battery such as those used for automotive service become readily apparent. The need, as is well expressed in the very name, is to separate the plates to keep them from touching and thereby creating internal short circuits. The requirements of the separator primarily include the following:

(1) Non-conduction of electricity
(2) Electolyte permeability
(3) Acid-resistance
(4) Oxidation resistance
(5) Dimensional stability Any number of substances qualify as non-conductors of electricity. Electrolyte permeability is more difficult to achieve. Basically the characteristic is a function of the porosity of the material, but there is a definite limitation to the degree of porosity and the manner in which it is achieved. Referring back to the basic electrochemical reaction, it will be noted that while lead, lead dioxide and lead sulfate are substantially insoluble in the electrolyte, the reaction proceeds by means of the formation of the electrolyte soluble di- or tetra-valent lead ion. While the existence of these ions is merely transitory, their existence does permit a minor degree of mobility in both the lead of the negative plate and the lead dioxide of the positive plate. In the case of the negative plate, this mobility permits the creation of "trees," excrescences of lead from the surface of the plate. While the separator must be porous, it must not be so porous as to permit the passage of trees since the contact of a tree with a positive plate causes an internal short.

On the positive plate, the mobility of the lead ion is a contributing cause of paste shedding. Since ion formation on both the negative and the positive plate is a function of the point density of the current and hence of the hydrogen ion transfer through the electrolyte, it follows that the separator should be uniformly permeable to the electrolyte over its entire surface.

In view of these basic requirements, very few materials have been satisfactory for use as battery separators. The satisfactory materials include certain sections and veneers of wood such as those of Port Orford cedar, microporous structures of rubber and certain other thermoplastics, non-felted webs of glass or thermoplastic resin fibers, and of recent importance water-laid cellulosic felts impregnated with an acid-resistant thermosetting resin.

The latter type of separator is described in a number of recent United States patents including: Uber 2,543,137; Wilson et al. 2,591,754; Wilson et al. 2,591,755; Merrill 2,626,429; Uhlig et al. 2,662,032; Uhlig et al. 2,662,106; Uhlig et al. 2,662,107; Uhlig et al. 2,678,961; Merrill 2,687,445; Merrill 2,687,446, and Merrill 2,687,447.

In each case, the requisite porosity of the separator is achieved by a careful selection and treatment of cellulose fibers including in certain cases dispersed glass fibers, and by a careful formation of that pulp into a fibrous web. Acid resistance is achieved by impregnating that web with a low viscosity solution of a potentially acid resistant thermosetting resin, usually an A-stage phenol-formaldehyde resin dissolved either in water or alcohol, so as to provide a uniform coating of the resin on all of the wood fibers. In each case, the process of preparing the separator includes curing the resin coating to its C or infusible stage. There are, of course, significant differences as to particular features in the various separators disclosed.

Among these features are the dimensionally stable ribs disclosed in Merrill 2,626,429 and Merrill 2,687,445. Ribs are important to provide for the circulation of the electrolyte especially adjacent the positive plates of the ---
[1] See Vinal Storage Batteries, 4th Edition, John Wiley & Sons, New York 1955, pg. 55 et. seq.

separator. Since the tops of the ribs come into direct contact with the lead dioxide of the positive plates, Merrill provided the top of his ribs with an additional coating of an acid-resistant thermosetting resin which among other things protected that region of his separator from oxidation.

This disclosure illustrates an important point common to all prior art separators of this type. This is that the final properties of the separator are the result of a compromise at every stage of the formation of the separator.

It has been well established that the resultant electrical resistance of the separator at a given degree of resin impregnation is a function of the porosity of the fibrous web as measured by the rate of passage of air therethrough. The more porous the web, the lower the resistance. At the same time, porosity beyond a certain point was achieved only at the penalty of poor and uneven formation and insufficient mechanical strength in the web. Thus the web is made as porous as possible, consistent with a sufficiently uniform formation and an acceptable mechanical strength.

The same holds true of the impregnation. In order to render the web acid-resistant, each cellulose fiber must be completely protected with the acid-resistant resin. At the same time, however, the resin tends to reduce the size of the pores and thus to reduce the porosity of the web. If too much resin is used, plugging of the pores results with a resultant sharp increase in resistance.

In addition, the acid resistance of the resin is to a large degree a function of the completeness of the cure (e. g., its advance to the C-stage). However, the more completely the resin is cured, the more likely the resulting separator is to be brittle. A brittle separator may crack during ordinary handling in the course of assembly of the storage battery.

Added to this is the fact that a consderably greater quantity of resin is required to impart any significant degree of oxidation resistance to the separator than is required to impart merely acid resistance. A certain degree of oxidation resistance is required even in those areas which do not come into direct contact with the positive plate, since there is a considerable degree of shedding of the positive plate during the normal life of a separator. Thus the web portions of the separator on the side nearest the positive plate are likely to come into some contact with lead dioxide.

It has been proposed to impregnate the porous cellulosic webs with a solution or a dispersion of an acid-resistant, thermoplastic resin, rather than a solution of an A-stage thermosetting resin. Such resins by their very nature are often more oxidation-resistant than the thermosetting resins. This proposal has several very serious drawbacks. These are primarily based on the fact that a thermosetting resin can be applied to the fibers of the web at a low molecular weight and can be converted to a high molecular weight in place after application. Thermoplastic resins, on the other hand, must be completely polymerized before application. Because of the high molecular weight of such resins, solutions, unlike those of A-stage thermosetting resins, are viscous and do not readily penetrate the interstices of the web. Alternatively, thermoplastic resins may be applied in the form of an aqueous dispersion. In this case, the web acts as a filter mat, and no matter how fine the dispersed resin particles may be within the limits of present technology, a uniform impregnation throughout the web cannot be achieved. Indeed, if it is attempted to supply a sufficient quantity of resin in this manner, plugging of the interstices of the web occurs adjacent the surfaces thereof with a resulting high electrical resistance.

Even though mechanical separators of the thermosetting resin impregnated cellulosic web type have come into widespread use and have enjoyed greatly commercial success, they have not been completely satisfactory in all respects because of the limitations referred to above. For example, certain of these separators which have the requisite degree of acid resistance, low electrical resistance and uniformity have but marginal handleability due to the attempt to attain the highest possible degree of oxidation resistance. All too frequently such separators become corroded through at one or more places during service. The apparent cause of such separator failure is that a particle of lead dioxide released during the normal shedding of the positive paste became wedged between the positive plate and the web of the separator.

We have discovered a means whereby outstanding oxidation resistance may be imparted to the face of a separator, thereby substantially eliminating this cause of separator failure. At the same time, we have provided for a greater latitude in the rigorous limitations heretofore imposed upon the preparation of separators whereby superior mechanical strength and flexibility can be imparted to the separator without loss in any of the essential characteristics such as acid resistance and low electrical resistance.

We have discovered that these results may be obtained if the fibers of the web are encapsulated with an acid and oxidation resistant thermoplastic resin. We have further found that it is only necessary to so encapsulate the fibers of the web in the top few thousandths of an inch over the entire surface of the side which will be placed nearest the positive plate in order to provide the desired oxidation resistance. By providing for oxidation resistance in this manner, we are able to use only that quantity of thermosetting resin applied to the fibers throughout the separator necessary for acid resistance. Using only this quantity of thermosetting resin permits a greater choice in the selection of the cellulosic web and in any event results in a greater degree of flexibility in the separator, all without loss of the other essential properties of the finished separator. The nature of this improvement can be seen by reference to the drawing:

Figure 1 is a front view of a separator embodying the present invention.

Figure 2 is an enlarged view of a portion of the separator of Figure 1 showing the encapsulation of the fibers in the treated face.

Figure 3 is an enlarged view of the separator shown in Figure 1, showing the fibers in the untreated face.

In the figures, the separator is indicated at 1, the individual cellulosic fibers are indicated at 2, and the encapsulated cellulosic fibers are indicated at 3.

We prefer to apply the thermoplastic resin in an aqueous dispersion by means of a well atomized spray. Any conventional form of spraying equipment may be used for this purpose provided that a uniform distribution of well atomized droplets is obtained over the entire web with the limited quantity of material.

Any of a number of known thermoplastic resins which are both acid resistant and oxidation resistant may be used for this purpose. These include polyvinyl chloride, polystyrene, polyethylene, chlorosulfonated polyethylene, copolymers of butadiene and styrene, copolymers of isoprene and styrene, copolymers of acrylonitrile and butadiene and polymers and copolymers of isobutylene (e. g. polyisobutylene and the copolymer of isobutylene and isoprene). In addition, certain other thermoplastic resins such as certain of the polyester resins, certain of the epoxy resins, polyvinyl butyral, coumarone-indene, melamine, vinyl nitrile rubber, neoprene, natural rubber, chlorinated natural rubber and rubber hydrochloride may be used. Some of this latter group are difficult to obtain in a satisfactory aqueous dispersion and may require compounding according to methods well known in the art to obtain the required degree of oxidation resistance. In any event, the particular resin selected must be capable of reflowing (fluxing) at temperatures not injurious to the cellulosic web in order that the fibers in the treated area may be completely encapsulated with a coating of the resin.

Because of its superior acid and oxidation resistance, we prefer to use polyvinyl chloride as our thermoplastic resin. Aqueous dispersions of this material having fine particle size and superior mechanical stability are readily obtainable. In addition, polyvinyl chloride fluxes readily at temperatures used to cure the thermosetting resin. While vinyl chloride-acetate copolymers would appear to have many of the same properties, we prefer to avoid the use of these materials for fear that acetic acid might be released under some conditions. Small quantities of acetic acid are known to have deleterious effects especially upon the positive plate under some conditions.

Finely divided, acid resistant fillers may be added to the resin dispersion. Such fillers include diatomaceous earth, various clays, and certain siliceous materials including particularly calcium-magnesium silicate. While successful results have been obtained using as much as 50 parts of calcium-magnesium silicate to 50 parts of polyvinyl chloride resin solids, we prefer, in order to insure a continuous resin coating on the fibers, to use a lesser proportion of filler as, for example, 25 parts to 75 parts of resin solids.

The resin dispersion may also be compounded with other materials such as plasticizers, stabilizers, thickening agents and the like. The nature, effect and methods of addition of such materials are well known in the dispersion art.

While we have successfully used resin dispersions having as low as 5% and as high as 40% solids content, we prefer to use dispersions having a total solids in the range 15 to 35%. The lower concentrations with their increased proportion of water increase the drying problem, and the higher concentrations increase the problem of obtaining a uniform distribution of the resin. Within the preferred range, changing the concentration provides an easy mechanism for changing the quantity of resin applied to the separator.

We have found that a satisfactory degree of oxidation resistance is obtained with as little as 1.2 pounds of resin composition (including filler, if any) solids applied to each one thousand square feet of separator material. There is no appreciable increase in electrical resistance until about 4 pounds of solids per thousand square feet is applied. Above 4 pounds per thousand square feet, the electrical resistance is increased, but as much as 6 pounds per thousand square feet may be used with satisfactory results especially for separators designed to be used for storage batteries in which high rates of discharge are not required but where truly outstanding oxidation resistance is an advantage.

Microscopic examination of the treated separator shows that within the range of thermoplastic resin application specified, all the individual fibers visible from the treated surface of the separator are completely encapsulated with thermoplastic resin. The resin does not appear to penetrate beyond this line of sight distance even though the web may be completely penetrated by the aqueous phase of the dispersion. In the particular formation of paper that we prefer to use, the depth of penetration is about 0.007". At less than 1.2 pounds per thousand square feet, the encapsulation is not complete, although the depth of penetration remains constant. At above about 6 pounds per thousand square feet, the resin begins to web and bridge and otherwise completely close to the pore openings to an excessive degree.

The separator material may be treated with thermoplastic resin at any time after the cellulosic web has been impregnated with thermosetting resin and has been dried. It is preferable to apply the aqueous dispersion at some time prior to the final curing or drying operation in order to avoid the necessity of an additional heating step. The thermoplastic resin may be applied before the thermosetting resin has been cured, in which case the thermosetting resin is cured and the thermoplastic resin is fluxed simultaneously without any adverse effects.

It is customary to further impregnate the impregnated separator material with a solution of a wetting agent to insure the rapid penetration of the separator by the electrolyte. The wetting agent, which is well described in the prior art, may be combined with the dispersion of the thermoplastic resin if desired.

Satisfactory acid resistance, at least for separators designed for shorter life batteries, may be obtained with as little as 10 or 15 parts by weight of the thermosetting resin solids per 85 parts of cellulosic web. We prefer to make our separators according to the general disclosure of Merrill 2,626,429 and have found that the most satisfactory rib structure results if at least 25 parts of thermosetting resin per 75 parts of cellulosic web is used. We also prefer to continue to apply additional coatings of thermosetting resin to the tops of the ribs as disclosed therein to provide for additional rib stability even though this additional thermosetting resin is not required for oxidation resistance.

Our preferred sequence of operations is as follows:
(1) Impregnation of web with solution of thermosetting resin
(2) Drying
(3) Rib formation
(4) Application of additional resin to ribs
(5) Curing
(6) Application of wetting agent solution
(7) Spraying the ribbed surface with aqueous dispersion of thermoplastic resin
(8) Drying and fluxing the thermoplastic resin.

Alternatively, we may use the following sequence of operations:
(1) Impregnation of web with solution of thermosetting resin
(2) Drying
(3) Rib formation
(4) Impregnation with aqueous solution of wetting agent
(5) Spraying the ribbed surface with aqueous dispersion of thermoplastic resin
(6) Application of additional resin to the ribs
(7) Drying, curing and fluxing.

Typical formulations for separators embodying the present invention are as follows:

A. Light duty separator:

(a) Paper base:
  Basis weight _____ 92 pounds.
    (lbs./500 2' x 3' sheets)
  Caliper _____ 0.023".
  Compactness _____ 3.55.
    (Basis wt./Caliper in 0.001")
(b) Impregnation _____ 25–29% of total weight of paper plus thermosetting resin.
(c) Thermoplastic resin __ 1.6 pounds dispersion composition solids per 1000 square feet of separator material.

B. General purpose separator for automotive service
(a) Paper base:
  Basis weight _____ 97 pounds.
  Caliper _____ 0.024".
  Compactness _____ 4.05.
(b) Impregnation _____ 25–29%.
(c) Thermoplastic resin __ 2.4 pounds/thousand square feet.

C. Separator for heavy duty service such as in truck, bus, marine or commercial batteries.
  (a) Paper base:
    Basis weight _____ 106 pounds.
    Caliper _____ 0.027".
    Compactness _____ 4.0.
  (b) Impregnation_____ 25–29%.
  (c) Thermoplastic resin__ 4.8 pounds/thousand square feet.

We claim:

1. A method for rendering one surface of a plate separator for storage batteries, formed of a water-laid felt impregnated with a synthetic, acid-resistant, thermoset resin, resistant to oxidation in the presence of lead dioxide, which comprises spraying that surface with an aqueous dispersion of an acid- and oxidation-resistant thermoplastic resin at a rate of between 1.2 and 6 pounds of dispersion solids per 1000 square feet of separator material surface and subsequently fluxing the thermoplastic resin.

2. The method described in claim 1 wherein the dispersion of thermoplastic resin contains an acid-resistant filler.

3. The method described in claim 1 wherein the thermoplastic resin is polyvinyl chloride.

4. The method described in claim 1 wherein the resin is polystyrene.

5. The method described in claim 1 wherein the resin is polyethylene.

6. The method described in claim 1 wherein the resin is the copolymer of butadiene and styrene.

7. The method described in claim 1 wherein the resin is the copolymer of isobutylene and isoprene.

8. A plate separator for storage batteries formed of a water-laid felt impregnated with a synthetic, acid-resistant, thermoset resin in which one surface is rendered resistant to oxidation in the presence of lead dioxide wherein the fibers in said felt visible from said surface are encapsulated with an acid and oxidation resistant, thermoplastic resin composition said separator containing between 1.2 and 6.0 pounds per thousand square feet of separator material of said thermoplastic resin composition.

References Cited in the file of this patent

UNITED STATES PATENTS

| | | |
|---|---|---|
| 2,647,157 | Booth | July 28, 1953 |
| 2,687,447 | Merrill | Aug. 24, 1954 |
| 2,724,011 | Strauss | Nov. 15, 1955 |

FOREIGN PATENTS

| | | |
|---|---|---|
| 708,350 | Great Britain | May 5, 1954 |